US011513817B2

(12) United States Patent
Oliveri et al.

(10) Patent No.: US 11,513,817 B2
(45) Date of Patent: Nov. 29, 2022

(54) PREVENTING DISRUPTION WITHIN INFORMATION TECHNOLOGY ENVIRONMENTS

(71) Applicant: KYNDRYL, INC., New York, NY (US)

(72) Inventors: Facundo Miguel Oliveri, Indaiatuba (BR); Sergio Varga, Campinas (BR); Marcos Francisco Pereira da Silva, Piracicaba (BR); Robson Luiz Nunes de Oliveira, Sumare (BR); Samuel Pizarro, Sumare (BR)

(73) Assignee: Kyndryl, Inc., New York, NY (US)

( * ) Notice: Subject to any disclaimer, the term of this patent is extended or adjusted under 35 U.S.C. 154(b) by 324 days.

(21) Appl. No.: 16/808,571

(22) Filed: Mar. 4, 2020

(65) Prior Publication Data
US 2021/0279075 A1   Sep. 9, 2021

(51) Int. Cl.
*G06F 9/445* (2018.01)
*G06F 11/07* (2006.01)
*G06F 11/30* (2006.01)
*G06F 9/54* (2006.01)
*G06F 8/71* (2018.01)

(52) U.S. Cl.
CPC ............ *G06F 9/44505* (2013.01); *G06F 8/71* (2013.01); *G06F 9/542* (2013.01); *G06F 11/0775* (2013.01); *G06F 11/0793* (2013.01); *G06F 11/3051* (2013.01)

(58) Field of Classification Search
CPC ........ G06F 9/44505; G06F 8/71; G06F 9/542; G06F 11/0775; G06F 11/0793; G06F 11/3051
See application file for complete search history.

(56) References Cited

U.S. PATENT DOCUMENTS

| 5,721,825 A | 2/1998 | Lawson |
| 7,103,504 B1 | 9/2006 | McGlaughlin |
| 7,542,877 B2 * | 6/2009 | Nakamura ............ G06F 11/008 702/182 |

(Continued)

FOREIGN PATENT DOCUMENTS

| CN | 105631522 A | 6/2016 |
| WO | 2007030633 A2 | 3/2007 |

OTHER PUBLICATIONS

Disclosed Anonymously, "Method and system to dynamically map cloud services topology and status into a business dashboard service tree in a multitenancy environment", IP.com No. IPCOM000210962D IP.com Electronic Publication Date: Sep. 19, 2011, 4 pages.

*Primary Examiner* — Douglas M Slachta
(74) *Attorney, Agent, or Firm* — John Kennel; Matthew M. Hulihan; Heslin Rothenberg Farley & Mesiti PC

(57) ABSTRACT

A determination is made whether an incident that affects one configuration item in a plurality of configuration items within an information technology environment impacts at least one event for at least one other configuration item in the plurality of configuration items. In response to determining that the incident does impact at least one event on at least one other configuration item, one or more pre-defined actions to execute on the at least one other configuration item are identified. The identified one or more pre-defined actions are executed on the at least one other configuration item.

20 Claims, 3 Drawing Sheets

(56) References Cited

U.S. PATENT DOCUMENTS

| | | |
|---|---|---|
| 7,805,407 B1 | 9/2010 | Verbeke |
| 8,234,387 B2 | 7/2012 | Bradley |
| 8,930,470 B2 | 1/2015 | Canessa |
| 9,838,415 B2* | 12/2017 | Powers ............... H04L 63/1441 |
| 10,031,799 B1* | 7/2018 | Young ................... G06F 11/076 |
| 10,061,371 B2 | 8/2018 | Geffin |
| 10,061,664 B2 | 8/2018 | Verkaik |
| 10,191,732 B2 | 1/2019 | Kludy |
| 10,282,248 B1* | 5/2019 | Gudka ................ G06F 11/0787 |
| 10,642,713 B1* | 5/2020 | McColgan .......... G06F 11/3051 |
| 10,862,905 B2* | 12/2020 | Zettel, II ............ H04L 63/1483 |
| 11,133,997 B2* | 9/2021 | Kerry ................. G06F 11/3476 |
| 2006/0053021 A1 | 3/2006 | Bystedt |
| 2006/0064481 A1 | 3/2006 | Baron |
| 2006/0168170 A1* | 7/2006 | Korzeniowski ..... H04L 41/0631 709/224 |
| 2007/0220303 A1* | 9/2007 | Kimura .................. H04L 69/40 714/4.11 |
| 2007/0277155 A1* | 11/2007 | Casey ................. G06F 11/3466 717/124 |
| 2011/0137991 A1 | 6/2011 | Russell |
| 2012/0005609 A1* | 1/2012 | Ata ..................... G06F 11/0754 715/771 |
| 2012/0290870 A1* | 11/2012 | Shah ................... H04L 63/123 714/E11.073 |
| 2013/0007245 A1* | 1/2013 | Malik ................. H04L 63/1433 709/223 |
| 2013/0055399 A1* | 2/2013 | Zaitsev ............... H04L 63/0263 726/25 |
| 2014/0134947 A1 | 5/2014 | Stouder-Studenmund |
| 2014/0310810 A1* | 10/2014 | Brueckner .......... G06F 9/45533 726/23 |
| 2016/0154692 A1* | 6/2016 | Heinz ................. G06F 11/0772 714/2 |
| 2017/0344414 A1* | 11/2017 | Raj .................... G06F 11/0721 |
| 2018/0173216 A1* | 6/2018 | Spiro ................. G06F 11/3003 |
| 2019/0079818 A1* | 3/2019 | Handa ................ G06F 11/0772 |

* cited by examiner

PREVENTING DISRUPTION WITHIN INFORMATION TECHNOLOGY ENVIRONMENTS

BACKGROUND

The present invention relates generally to the field of information technology (IT) environments, and more particularly to preventing disruption within IT environments.

An IT environment is an integrated collection of technology components that serves the needs of its users and the owner of the resulting system. The complexity of an IT environment can vary widely from simple (e.g., a small business owner with a laptop computer and all-in-one printer/scanner/copier) to highly complex (e.g., a large enterprise with a combination of on-premises equipment and various cloud services such as public, private, and hybrid cloud). There are a number of software tools required for managing the complex IT environments. The functionality of these tools can include, but is not limited to, management of incidents and changes; monitoring for out-of-specification conditions; scheduling; service level agreement measurement tools; performance metrics tools; messaging; configuration management; security; and licensing compliance.

SUMMARY OF THE INVENTION

Embodiments of the present invention include an approach for preventing disruption within information technology (IT) environments. In one embodiment, a determination is made whether an incident that affects one configuration item in a plurality of configuration items within an information technology environment impacts at least one event for at least one other configuration item in the plurality of configuration items. In response to determining that the incident does impact at least one event on at least one other configuration item, one or more pre-defined actions to execute on the at least one other configuration item are identified. The identified one or more pre-defined actions are executed on the at least one other configuration item.

DETAILED DESCRIPTION

Embodiments of the present invention recognize that managing an information technology (IT) environment is a daunting task. Software utilized in an IT environment often comes from several vendors and there may be little to no integration amongst those vendor software packages. This can result in an IT environment that is prone to several risk and technical issues. Further, technical support can be spread amongst specialized teams over widely separated geographic areas. Based on geography, language barriers can occur. This methodology can lead to anything from minor annoyances to major downtime of the IT environment.

Embodiments of the present invention recognize that there may be a method, computer program product, and computer system for preventing disruption within IT environments. In an embodiment, the method, computer program product, and computer system utilize an automated system to share incidents between the various equipment items within the IT environment and coordinating responses in a unified way in response to any incident within the IT environment. Benefits from this automated system include, but are not limited to, faster recognition of incidents by all of the computing devices within the IT environment; reducing the risk of outages of some, or all, of the IT environment; reducing the amount of incident tickets; and reducing coordination efforts between support teams, thereby reducing costs. Another benefit is the streamlining of the technical support required for a complex, world-wide IT environment (e.g., on-premise locations in North America, Europe, the United Kingdom, and Australia, and a mixture of multiple hybrid and private clouds services from several different vendors). This type of complex IT environment encounters difficulties such as language barriers, inconsistencies between various hardware suppliers, incompatibilities between different software programs, different levels of software, etc., and utilizing the present invention mitigates or eliminates these difficulties.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
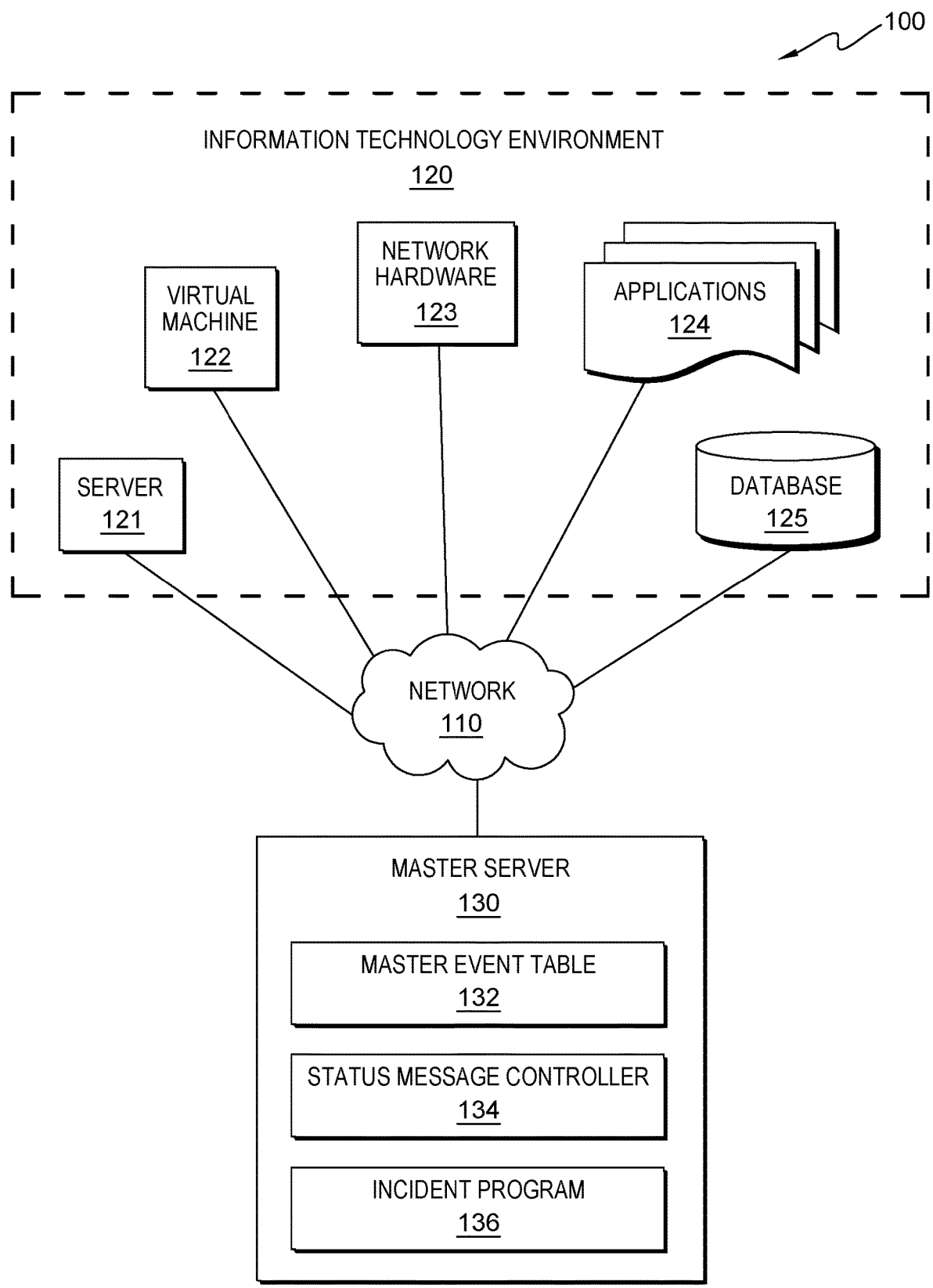
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes information technology (IT) environment 120 and master server 130, interconnected by network 110. In example embodiments, computing environment 100 includes other computing devices (not shown in FIG. 1) such as smartwatches, cell phones, additional smartphones, wearable technology, phablets, tablet computers, additional laptop computers, additional desktop computers, other computer servers or any other computer system known in the art, interconnected with IT environment 120 and master server 130 over network 110.

In embodiments of the present invention, IT environment 120 and master server 130 are connected to network 110, which enables IT environment 120 and master server 130 to access other computing devices and/or data not directly stored on IT environment 120 and master server 130. Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between IT environment 120 and master server 130, and any other computing devices (not shown in FIG. 1) connected to network 110, in accordance with embodiments of the present invention. In an embodiment, data received by another computing device (not shown in FIG. 1) in computing environment 100 is communicated to IT environment 120 and master server 130 via network 110.

According to an embodiment of the present invention, IT environment 120 is an integrated collection of technology components that serves the needs of its users and the owner of the resulting system. In an embodiment, computing environment 100 can include any number of IT environments similar to IT environment 120. Technology components comprising IT environment 120 can include, but are not limited to, servers; personal computers; tablets; smartphones; virtual machines; network hardware, including routers, switches, firewalls, virtual private networks, etc.; software applications; databases; and the like. In an embodiment, IT environment 120 can be an on-premises environment, a private cloud environment, a public cloud environment, a hybrid cloud environment, or any combination of the preceding environments. According to one embodiment, IT environment 120 includes server 121, virtual machine 122, network hardware 123, applications 124, and database 125. In the embodiment, each of server 121, virtual machine 122, network hardware 123, applications 124, database 125, and any other component or system (not shown in FIG. 1) that can be uniquely identified is considered a configuration item within IT environment 120.

In an embodiment, server 121 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server 121 can be a standalone computing device, a management server, a web server, a mobile computing device, or any other electronic device or computing system capable of receiving, transmitting, and processing data. In other embodiments, server 121 can represent computing systems utilizing multiple computers as a server system, such as in a cloud computing environment. In certain embodiments, server 121 represents a computer system utilizing clustered computers and components (e.g., database server computers, application server computers, etc.) that act as a single pool of seamless resources when accessed by elements of computing environment 100. In general, server 121 is representative of any electronic device or combination of electronic devices capable of executing computer readable program instructions. In an embodiment, IT environment 120 includes any number of servers such as server 121. Server 121 may include internal and external hardware components as depicted and described in further detail with respect to FIG. 3, in accordance with embodiments of the present invention.

According to embodiments of the present invention, virtual machine 122 is an emulation of a computer system. In an embodiment, virtual machine 122 is based on computer architectures and provides the functionality of a physical computer. In the embodiment, implementation of virtual machine 122 may involve specialized hardware, software, or a combination of hardware and software. Virtual machine 122 may be a system virtual machine, which provides a substitute for a real computer and is capable of providing the functionality to execute the entire operating system, or a process virtual machine, which executes computer programs and applications in a platform-independent environment. According to an embodiment, IT environment 100 can include any number of virtual machine 122.

In one embodiment, network hardware 123 is a collection of electronic devices which are required for communication and interaction between devices on a computer network, such as IT environment 120. Specifically, network hardware 123 mediates data transmission in the computer network. In an embodiment, network hardware 123 includes, but is not limited to, gateways; routers; network bridges; modems; wireless access points; networking cables; line drivers; switches; hubs; and repeaters. In the embodiment, network hardware 123 may also include hybrid network devices such as multilayer switches; protocol converters; bridge routers; proxy servers; firewalls; network address translators; multiplexers; network interface controllers; wireless network interface controllers; integrated services digital network (ISDN) terminal adapters; and other related hardware. In one embodiment of the present invention, there may be any number of network hardware 123 in IT environment 120.

According to one embodiment of the present invention, applications 124 are a plurality of software programs and applications that perform a variety of functions within IT environment 120. An individual application 124 (or an individual software program) is a collection of instructions that performs a specific task when executed by a computer. In an embodiment, applications 124 are written by a computer programmer in a programming language called source code (which is human-readable); from the source code, a compiler is able to derive machine code which is a form of applications 124 consisting of instructions that a computer can directly execute. Applications 124 can include applications software and system software. According to an embodiment, IT environment 120 can include any number of applications 124.

In an embodiment, database 125 is a collection of information that is organized in a memory so that it can be easily accessed, managed, and updated. Database 125 contains an aggregation of data records or files, containing information about such things as sales transactions, interactions with customers, employee data, electronic medical records, historical information, and any other type of data that may need to be accessed, managed, and updated. In an embodiment, database 125 may be a relational database or a graph database. According to one embodiment of the present invention, there can be any number of database 125 in IT environment 120.

According to an embodiment, master server 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, master server 130 can be a standalone computing device, a management server, a web server, a mobile computing device, or any other electronic device or computing system capable of receiving, transmitting, and processing data. In other embodiments, master server 130 can represent computing systems utilizing multiple computers as a server system, such as in a cloud computing environment. In certain embodiments, master server 130 represents a computer system utilizing clustered computers and components (e.g., database server computers, application server computers, etc.) that act as a single pool of seamless resources when accessed by elements of computing environment 100. In general, master server 130 is representative of any electronic device or combination of electronic devices capable of executing computer readable program instructions. In an embodiment, computing environment 100 includes any number of master server 130. Master server 130 may include internal and external hardware components as depicted and described in further detail with respect to FIG. 3, in accordance with embodiments of the present invention. In one embodiment, master server 130 includes master event table 132, status message controller 134, and incident program 136.

In an embodiment, master event table 132 is a table of configuration items and associated functions and one or more actions to take upon the identification of an incident for any configuration item within IT environment 120. According to an embodiment, an incident is a planned or unplanned status change to the normal operation of a configuration item. Examples of incidents include, but are not limited to, hardware failure; a database crash; one or more applications stop working; planned maintenance of a configuration item resulting in the configuration item being taken offline for a period of time; network connectivity drops; and the like. In an embodiment, master event table 132 is on master server 130. In another embodiment, master event table 132 is on each configuration item included in IT environment 120. In yet another embodiment, master event table 132 is on each configuration item included in computing environment 100. According to an embodiment, whenever an instance of master event table 132 is updated, all instances of master event table 132 are updated with the same information in real time. In an embodiment, the associated actions included in master event table 132 are based on the specific configuration item and the actual configuration item affected by an incident. For example, if an incident is the planned downtime for a server update, the associated action for a database might be "do not perform backup operations", the associated action for a job scheduler application might be "hold jobs from running, the associated action for a monitoring tool might be "hold server monitoring", the associated action for a performance metrics application might be "do not collect metrics", and the associated action for a jump host or gateway might be to display a messages such as "access to server is denied".

According to an embodiment of the present invention, status message controller 134 is a messaging module which is capable of communicating with each of the configuration items within computing environment 100, including those within IT environment 120. In one embodiment, status message controller 134 is on master server 130. In another embodiment, status message controller 134 is on each configuration item included in IT environment 120. In yet another embodiment, status message controller 134 is on each configuration item included in computing environment 100. According to an embodiment, messages sent by status message controller 134 include, but are not limited to, the following content: the configuration item or configuration items affected by the incident; and the details of the incident (e.g., what occurred to the configuration item(s), when the incident started, an expected end time for the incident, and an actual end time of the incident). In an embodiment, all configuration items in computing environment 100 can both transmit status messages and receive status messages via status message controller 134.

In an embodiment, incident program 136 can be a program, a subprogram of a larger program, an application, a plurality of applications, or mobile application software, which functions to prevent disruption within information technology (IT) environments. A program is a sequence of instructions written by a programmer to perform a specific task. In an embodiment, incident program 136 runs by itself. In other embodiments, incident program 136 depends on system software (not shown in FIG. 1) to execute. In yet other embodiments, incident program 136 works in conjunction with applications 124. In one embodiment, incident program 136 functions as a stand-alone program residing on master server 130. In another embodiment, incident program 136 works in conjunction with other programs, applications, etc., found in computing environment 100 and IT environment 120. In yet another embodiment, incident program 136 resides on any computing device within IT environment 120. In yet another embodiment, incident program 136 resides on other computing devices (not shown in FIG. 1) in computing environment 100, which are interconnected to IT environment 120 and master server 130 via network 110.

According to an embodiment, incident program 136 receives an indication of at least one incident impacting the normal operation of at least one configuration item. In the embodiment, incident program 136 retrieves and updates the master event table. Further in the embodiment, incident program 136 transmits a warning to each configuration item in the IT environment. Further yet in the embodiment, incident program 136 determines if there are any events on other configuration items that would be impacted by the incident. Further yet in the embodiment, responsive to determining that there are events that would be impacted by the incident, incident program 136 transmits one or more actions to the impacted configuration items as well as the configuration items not impacted. Further yet in the embodiment, incident program 136 receives a notification that the incident has been resolved. Further yet in the embodiment, incident program 136 transmits an update to each of the configuration items. Further yet in the embodiment, incident program 136 receives an update from each configuration item that normal operations have resumed.

Figure 2:
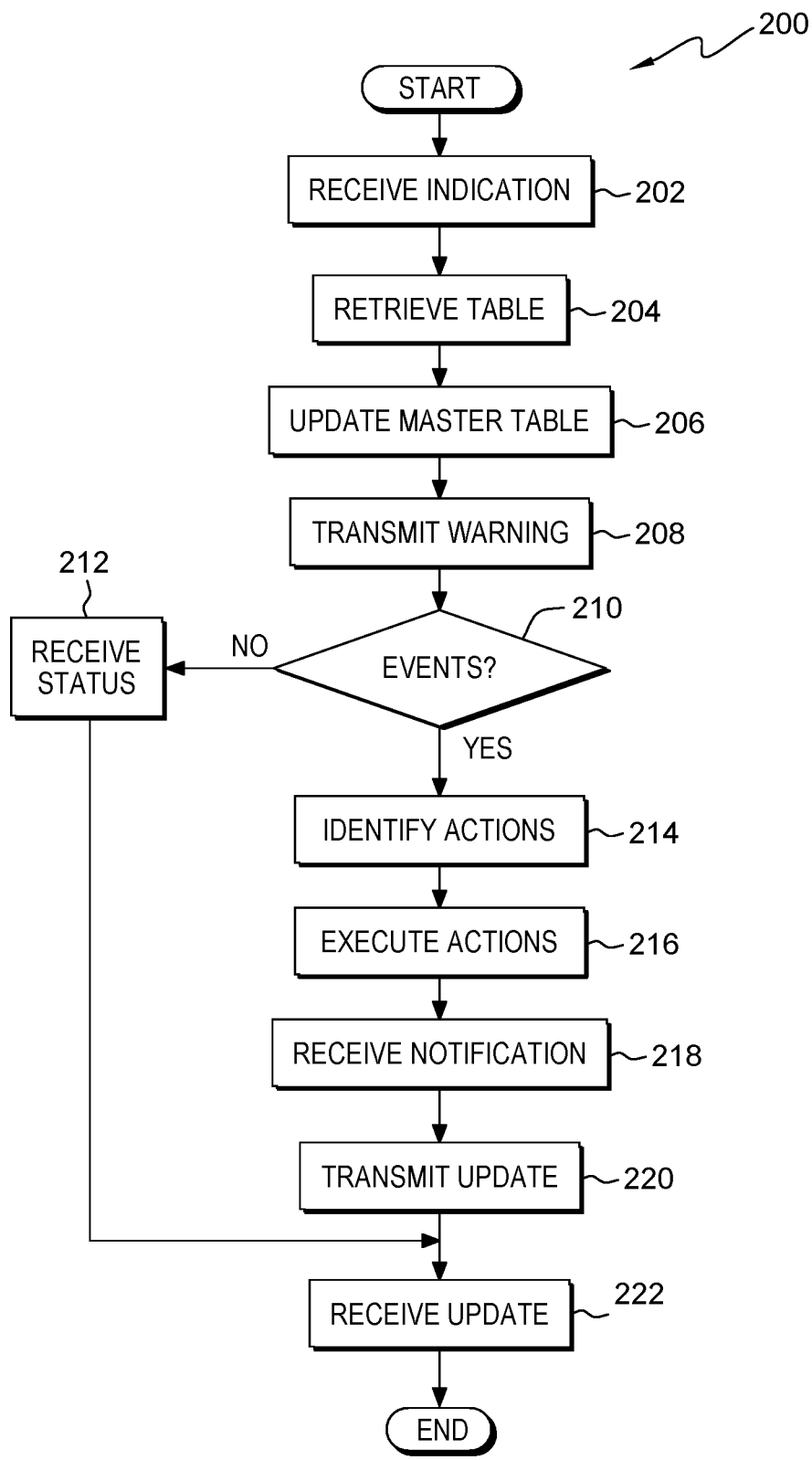
FIG. 2 depicts a flowchart of a program for preventing disruption within information technology (IT) environments, in accordance with an embodiment of the present invention.

FIG. 2 is a flowchart of workflow 200 depicting a method for preventing disruption within information technology (IT) environments. In one embodiment, the method of workflow 200 is performed by incident program 136. In an alternative embodiment, the method of workflow 200 is performed by any other program (e.g., one of applications 124) working with incident program 136. In an embodiment, a user of server 124 invokes workflow 200 upon taking server 124 offline. In an alternative embodiment, a user of server 124 invokes workflow 200 upon accessing incident program 136 on master server 130 via network 110.

In an embodiment, incident program 136 receives indication (step 202). In other words, incident program 136 receives an indication of at least on incident occurring that affects at least one configuration item in an information technology (IT) environment. In an embodiment, an incident is a planned or unplanned status change to the normal operation of a configuration item and the normal operation is the function that the configuration item was designed to perform. Examples of incidents include, but are not limited to, hardware failure; a database crash; one or more applications stop working; planned maintenance of a configuration item resulting in the configuration item being taken offline for a period of time; and network connectivity drops.

In the embodiment, a configuration item is any component or system in an IT environment that can be uniquely identified. Examples of configuration items in IT environment 120 include server 121, virtual machine 122, network hardware 123, applications 124, and database 125. Further in the embodiment, the indication includes information concerning the incident, including, but not limited to, the name of the affected at least one configuration item, the at least one incident affecting the at least one configuration item, the start time of the at least one incident, the expected duration of the at least one incident, and a current date and time stamp. According to an embodiment of the present invention, incident program 136 on master server 130 receives an indication of an incident affecting server 121 within IT environment 120. For example, a program on a laptop used by Joe (a server technician for a company) receives an indication of a company server going offline. In the example, Joe has taken the server offline for scheduled maintenance which should last one hour.

According to an embodiment of the present invention, incident program 136 retrieves table (step 204). In other words, responsive to receiving the indication of at least one incident affecting at least one configuration item, incident program 136 retrieves a master event table. In an embodiment, the master event table is a listing of configuration items, associated functions, and one or more actions to take upon the identification of an incident for any configuration item within an IT environment. In one embodiment, the master event table is stored to a central location, such as a master server. In another embodiment, the master event table is stored locally on each configuration item within the IT environment. In yet another embodiment, the master event table is stored to any computing device accessible by all configuration items in the IT environment. According to an embodiment of the present invention, incident program 136 retrieves master event table 132 from master server 130 (which is part of computing environment 100 but not within IT environment 120). For example, the program on the laptop used by Joe retrieves the master event table from its local memory.

In an embodiment, incident program 136 updates the master table (step 206). In other words, incident program 136 updates the retrieved master table with the incident information and then saves (i.e., stores to memory) the updated master event table. According to an embodiment of the present invention, incident program 136 updates the master event table with the name of the affected at least one configuration item, the at least one incident affecting the at least one configuration item, the start time of the at least one incident, the expected duration of the at least one incident, and a current date and time stamp. In an embodiment, when incident program 136 updates the master event table, the event table on each configuration item is updated in real time with the same information so that all configuration items have the same information. In the embodiment, the updated master event table is stored to a memory location (not shown in FIG. 1) after the update is complete. According to an embodiment of the present invention, incident program 136 updates master event table 132, retrieved from master server 130, with the information concerning the incident and stores the updated master event table to a memory. For example, the master event table, retrieved from the local memory of the laptop used by Joe, is updated with the following information: server "2" is offline for scheduled maintenance, the start time of the scheduled maintenance is 8:00 AM, the expected duration of the scheduled maintenance is one hour, and the current date and time is May 3, 2020 at 8:05 AM. Then the updated master event table is stored to the local memory.

In an embodiment, incident program 136 transmits warning (step 208). In other words, incident program 136 transmits a warning message to each configuration item that at least one incident has occurred to at least one configuration item in the IT environment. According to an embodiment of the present invention, the transmitted warning message can be configured in any format known in the art that is understood by all of the configuration items within the IT environment. In an embodiment, the transmitted warning message includes the name of the configuration item affected by the incident, the type of incident (e.g., a software update, an unexpected loss of power, a component change, etc.), the start time of the incident, the expected duration of the incident, and a current date and time stamp. According to an embodiment of the present invention, incident program 136 on master server 130 transmits a warning message, via status message controller 134 on master server 130, to each configuration item in IT environment 120. For example, the program on the laptop used by Joe sends a warning message to each configuration item in its IT environment; the warning message includes the following: a date/time stamp of May 3, 2020 at 8:06 AM, server "2" is offline for scheduled maintenance, the scheduled maintenance started at 8:00 AM and is expected to last for one hour.

According to an embodiment of the present invention, incident program 136 determines whether there are any events affected by the incident (decision step 210). In other words, incident program 136 determines whether any routine (i.e., normal) events for other configuration items are affected (i.e., impacted) by the at least one incident occurring on the at least one configuration item. In an embodiment, an event is a normal operation or function of a configuration item; i.e., the job the configuration item was designed to perform (e.g., a job scheduler schedules jobs for processing, a quality system will monitor metrics of the computing environment, a security tool will monitor for intrusions, etc.). In the embodiment, the configuration item can have any number of events. In one embodiment (decision step 210, NO branch), incident program 136 determines that no events are occurring for other configuration items; therefore, incident program 136 proceeds to step 212 to receive a status. In the embodiment (decision step 210, YES branch), incident program 136 determines that at least one event for at least one configuration item will be affected by the incident; therefore, incident program 136 proceeds to step 214 to transmit actions.

According to an embodiment of the present invention, incident program 136 receives status (step 212). In other words, incident program 136 receives a current status confirming normal operation of each configuration item within the IT environment. In an embodiment, incident program 136 receives a status message from each of server 121, virtual machine 122, network hardware 123, applications 124, and database 125 (i.e., the configuration items within IT environment 120), indicating normal operation. In the embodiment, the status message is routed via status message controller 134 on master server 130. For example, the program on the laptop used by Joe receives a status message indicating normal operation of each configuration item within the IT environment that includes server "2".

In an embodiment, incident program 136 identifies actions (step 214). In other words, responsive to determining that one or more events of one or more configuration items would be affected by the incident, incident program 136 identifies one or more pre-defined actions to execute on the one or more configuration items affected by the incident. According to an embodiment of the present invention, the one or more actions are pre-defined based on (i) the incident that is occurring, (ii) the configuration item where the incident is occurring, (iii) the configuration item(s) affected by the incident, and (iv) the event occurring on the affected configuration item(s). In an embodiment, incident program 136 identifies one or more actions to execute on the configuration items in IT environment 120 affected by the incident. For example, the program on the laptop used by Joe identifies the following one or more actions based on the "server '2' offline incident": (i) an action to stop backup operations is identified for the backup/restore configuration item, (ii) an action to hold jobs is identified for the job scheduler configuration item, (iii) an action to stop generating tickets is identified for the monitoring configuration item, (iv) an action to not attempt any operations is identified for the orchestration configuration item, (v) an action to stop collecting data is identified for the metrics configuration item, and (vi) an action to display an advisory message to any user trying to access server "2" is identified for the jump host/gateway configuration item.

According to at least one embodiment, incident program 136 executes actions (step 216). In other words, incident program 136 executes the identified one or more pre-defined actions on the one or more associated configuration items affected by the incident. In an embodiment, incident program 136 executes the one or more pre-defined actions on the one or more associated configuration items itself. In another embodiment, incident program 136 executes the one or more pre-defined actions on the one or more associated configuration items by transmitting an instruction set to each of the one or more associated configuration items and the one or more associated configuration items carryout the instruction set thereby executing the identified one or more pre-defined actions. According to an embodiment, incident program 136 executes the identified one or more pre-defined actions on the configuration items in IT environment 120 affected by the incident. For example, the program on the laptop used by Joe executes the following actions based on the incident of server "2" being taken offline: (i) the program stops any backup operations scheduled on the backup/restore configuration item; (ii) the program holds all jobs scheduled on the scheduler configuration item; (iii) the program stops the generation of tickets by the monitoring configuration item; (iv) the program prevents the orchestration configuration item from initiating any operations; (v) the program stops the metrics configuration item from collecting data; and (vi) the program displays an advisory message on the jump host/gateway configuration item indicating that users should not try to access server "2".

According to an embodiment of the present invention, incident program 136 receives notification (step 218). In other words, incident program 136 receives a notification from the configuration item where the incident occurred when the incident has been resolved (i.e., completed, fixed, etc.). In an embodiment, incident program 136 receives a notification via status message controller 134 that the incident affecting server 121 in IT environment 120 has been resolved. For example, the program on the laptop used by Joe receives a message from server "2" that the scheduled maintenance has been completed.

In an embodiment, incident program 136 transmits update (step 220). In other words, responsive to receiving the notification that the incident has been resolved, incident program 136 transmits an update to all of the configuration items in the IT environment to (i) return to normal operation and (ii) to update their respective event tables showing the incident as resolved. According to an embodiment of the present invention, incident program 136 transmits, via status message controller 134 on master server 130, an update to each of server 121, virtual machine 122, network hardware 123, applications 124, and database 125 to return to normal operation and to update their respective event tables. For example, the program on the laptop used by Joe transmits an update message to all of the configuration items in the same IT environment as server "2". In the example, the update message informs said configuration items to return to normal operation and to update their event tables.

According to an embodiment, incident program 136 receives update (step 222). In other words, responsive to transmitting the update to return to normal operation, incident program 136 receives an update message from each configuration item confirming that normal operation has resumed. In an embodiment, incident program 136 receives, via status message controller 134 on master server 130, an update message from each of server 121, virtual machine 122, network hardware 123, applications 124, and database 125 that each configuration item has resumed normal operations. For example, the program on the laptop used by Joe receives from each configuration item in the IT environment with server "2" that each has resumed normal operations.

Figure 3:
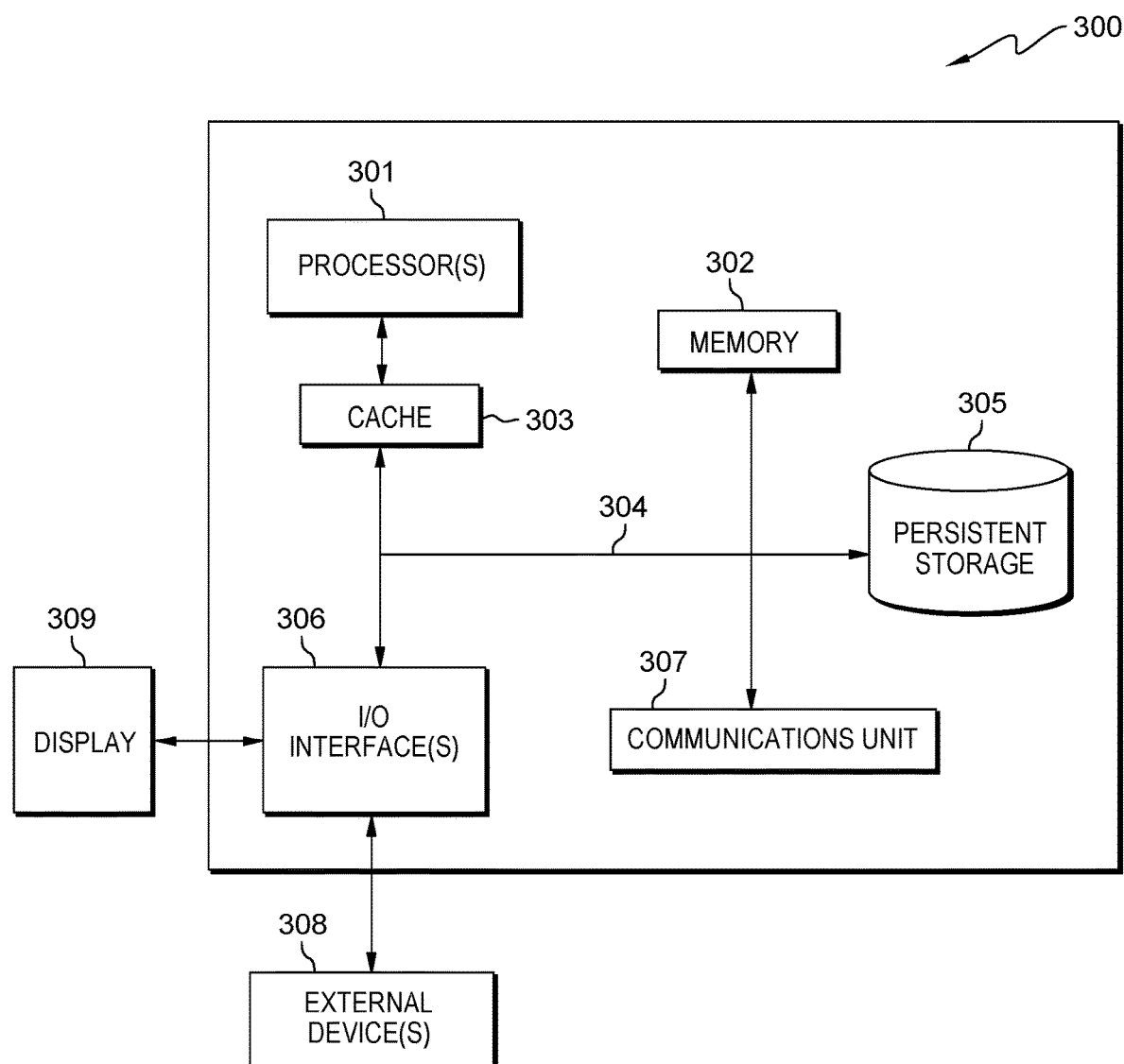
FIG. 3 depicts a block diagram of components of the computing environment of FIG. 1, in accordance with an embodiment of the present invention.

FIG. 3 depicts computer system 300, which is an example of a system that includes incident program 136. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
    determining, by one or more computer processors, whether an incident affecting at least one configuration item in a plurality of configuration items in an information technology environment impacts at least one event for at least one other configuration item in the plurality of configuration items;
    responsive to determining that the incident affecting the at least one configuration item in the plurality of configuration items impacts at least one event for the at least one other configuration item in the plurality of configuration items, identifying, by one or more computer processors, one or more pre-defined actions to execute on the at least one other configuration item in the plurality of configuration items;
    transmitting, to each configuration item in the plurality of configuration items, the plurality of configuration items including the at least one other configuration item and an additional one or more configuration items, in the plurality of configurations items, not determined by the determining to have events impacted by the incident affecting the at least one configuration item, an indication to update a respective event table stored on that configuration item to reflect the incident in the respective event table stored on that configuration item;
    executing, by one or more computer processors, the identified one or more pre-defined actions on the at least one other configuration item in the plurality of configuration items; and
    based on resolution of the incident, transmitting, to each configuration item in the plurality of configuration items, including the at least one other configuration item and the additional one or more configuration items, in the plurality of configuration items, not determined by the determining to have events impacted by the incident affecting the at least one configuration item, an indication to update the respective event table stored on that configuration item to reflect in the respective even table stored on that configuration item that the incident has been resolved.

2. The method of claim 1, further comprising:
    receiving, by one or more computer processors when the incident has been resolved, a notification from the at least one configuration item affected by the incident;
    transmitting, by one or more computer processors, an update to each configuration item in the plurality of configuration items in the information technology environment, wherein the update includes a message to return to a normal operation; and
    receiving, by one or more computer processors, a message from each configuration item in the plurality of configuration items indicating that the normal operation has resumed for each configuration item in the plurality of configuration items.

3. The method of claim 1, further comprising:
    responsive to determining that the incident affecting the at least one configuration item in the plurality of configuration items does not impact at least one event for at least one other configuration item in the plurality of configuration items, receiving, by one or more computer processors, a current status from the at least one other configuration item in the plurality of configuration items confirming normal operation.

4. The method of claim 1, wherein the one or more pre-defined actions are based on (i) the incident affecting the at least one configuration item in the plurality of configuration items, (ii) the at least one configuration item affected by the incident, (iii) the at least one other configuration item affected by the incident, and (iv) the at least one event occurring on the at least one other configuration item affected by the incident.

5. The method of claim 1, wherein:
    the incident is a planned or an unplanned status change to a normal operation of a configuration item; and
    the at least one event is a normal operation or function of the configuration item.

6. The method of claim 1, further comprising
    updating a master vent table with incident information about the incident, wherein the master is event table is comprised of a listing of each configuration item in the plurality of configuration items, one or more associated functions of each configuration item in the listing of configuration items, and one or more actions to take upon the determination of the incident for the at least one configuration item within the information technology environment,
    and wherein the master vent table is stored to a master server in the information technology environment.

7. The method of claim 1, further comprising:
    responsive to determining that the incident affecting the at least one configuration item in the plurality of configuration items impacts at least one event for at least one other configuration item in the plurality of configuration items, transmitting, by one or more computer processors, a warning to each configuration item in the plurality of configuration items in the technology environment, wherein the transmitted warning includes a name of a specific configuration item from the plurality of configuration items that is affected by the incident, a type of incident, a start time of the incident, an expected duration of the incident, and a current date and time stamp.

8. A computer program product, the computer program product comprising:
one or more computer readable storage media; and
program instructions stored on the one or more computer readable storage media, the program instructions comprising:
program instructions to determine whether an incident affecting at least one configuration item in a plurality of configuration items in an information technology environment impacts at least one event for at least one other configuration item in the plurality of configuration items;
responsive to determining that the incident affecting the at least one configuration item in the plurality of configuration items impacts at least one event for the at least one other configuration item in the plurality of configuration items, program instructions to identify one or more pre-defined actions to execute on the at least one other configuration item in the plurality of configuration items;
program instructions to transmit, to each configuration item in the plurality of configuration items, the plurality of configuration items including the at least one other configuration item and an additional one or more configuration items, in the plurality of configuration items, not determined by the determining to have events impacted by the incident affecting the at least one configuration item, an indication to update a respective event table stored on that configuration item to reflect the incident in the respective event table stored on that configuration item;
program instructions to execute the identified one or more pre-defined actions on the at least one other configuration item in the plurality of configuration items; and
program instructions to, based on resolution of the incident, transmit, to each configuration item in the plurality of configuration items, including the at least one other configuration item and the additional one or more configuration items, in the plurality of configuration items, not determined by the determining to have events impacted by the incident affecting the at least one configuration item, an indication to update the respective event table stored on the configuration item to reflect in the respective event table stored on that configuration item that the incident has been resolved.

9. The computer program product of claim 8, further comprising program instructions stored on the one or more computer readable storage media, to:
receive, when the incident has been resolved, a notification from the at least one configuration item affected by the incident;
transmit an update to each configuration item in the plurality of configuration items in the information technology environment, wherein the update includes a message to return to a normal operation; and
receive a message from each configuration item in the plurality of configuration items indicating that the normal operation has resumed for each configuration item in the plurality of configuration items.

10. The computer program product of claim 8, further comprising program instructions stored on the one or more computer readable storage media, to:
responsive to determining that the incident affecting the at least one configuration item in the plurality of configuration items does not impact at least one event for at least one other configuration item in the plurality of configuration items, receive a current status from the at least one other configuration item in the plurality of configuration items confirming normal operation.

11. The computer program product of claim 8, wherein the one or more pre-defined actions are based on (i) the incident affecting the at least one configuration item in the plurality of configuration items, (ii) the at least one configuration item affected by the incident, (iii) the at least one other configuration item affected by the incident, and (iv) the at least one event occurring on the at least one other configuration item affected by the incident.

12. The computer program product of claim 8, wherein:
the incident is a planned or an unplanned status change to a normal operation of a configuration item; and
the at least one event is a normal operation or function of the configuration item.

13. The computer program product of claim 8, further comprising program instructions stored on the one or more computer readable storage media to
update a master event table with incident information about the incident, wherein the master event table is comprised of a listing of each configuration item in the plurality of configuration items, one or more associated functions of each configuration item in the listing of configuration items, and one or more actions to take upon the determination of the incident for the at least one configuration item within the information technology environment,
and wherein the master event table is stored to a master server in the information technology environment.

14. The computer program product of claim 8, further comprising program instructions stored on the one or more computer readable storage media, to:
responsive to determining that the incident affecting the at least one configuration item in the plurality of configuration items impacts at least one event for at least one other configuration item in the plurality of configuration items, transmit a warning to each configuration item in the plurality of configuration items in the technology environment, wherein the transmitted warning includes a name of a specific configuration item from the plurality of configuration items that is affected by the incident, a type of incident, a start time of the incident, an expected duration of the incident, and a current date and time stamp.

15. A computer system, the computer system comprising:
one or more computer processors;
one or more computer readable storage media; and
program instructions stored on the one or more computer readable storage media for execution by at least one of the one or more computer processors, the program instructions comprising:
program instructions to determine whether an incident affecting at least one configuration item in a plurality of configuration items in an information technology environment impacts at least one event for at least one other configuration item in the plurality of configuration items;
responsive to determining that the incident affecting the at least one configuration item in the plurality of configuration items impacts at least one event for the at least one other configuration item in the plurality of configuration items, program instructions to identify one or more pre-defined actions to execute on the at least one other configuration item in the plurality of configuration items;
program instructions to transmit, to each configuration item in the plurality of configuration items, the plurality of configuration items including the at least one other configuration item and an additional one or more configuration items, in the plurality of configuration items, not determined by the determining to have events impacted by the incident affecting the at least one configuration item to reflect the incident in the respective event table stored on that configuration item;

program instructions to execute the identified one or more pre-defined actions on the at least one other configuration item in the plurality of configuration items; and program instructions to, based on resolution of the incident, transmit, to each configuration item in the plurality of configuration items, including that at least one other configuration item and the additional one or more configuration items, in the plurality of configuration items, not determined by the determining to have events impacted by the incident affecting the at least one configuration item, an indication to update the respective event table stored on the configuration item to reflect in that respective event table stored on that configuration item that the incident has been resolved.

16. The computer system of claim 15, further comprising program instructions stored on the one or more computer readable storage media for execution by at least one of the one or more computer processors, to:

receive, when the incident has been resolved, a notification from the at least one configuration item affected by the incident;

transmit an update to each configuration item in the plurality of configuration items in the information technology environment, wherein the update includes a message to return to a normal operation; and receive a message from each configuration item in the plurality of configuration items indicating that the normal operation has resumed for each configuration item in the plurality of configuration items.

17. The computer system of claim 15, further comprising program instructions stored on the one or more computer readable storage media for execution by at least one of the one or more computer processors, to:

responsive to determining that the incident affecting the at least one configuration item in the plurality of configuration items does not impact at least one event for at least one other configuration item in the plurality of configuration items, receive a current status from the at least one other configuration item in the plurality of configuration items confirming normal operation.

18. The computer system of claim 15, wherein the one or more pre-defined actions are based on (i) the incident affecting the at least one configuration item in the plurality of configuration items, (ii) the at least one configuration item affected by the incident, (iii) the at least one other configuration item affected by the incident, and (iv) the at least one event occurring on the at least one other configuration item affected by the incident.

19. The computer system of claim 15, wherein:
the incident is a planned or an unplanned status change to a normal operation of a configuration item; and
the at least one event is a normal operation or function of the configuration item.

20. The computer system of claim 15,
further comprising program instructions stored on the one or more computer readable storage media for execution by at least one of the one or more computer processors to update a master event table with incident information about the incident, wherein the master event table is comprised of a listing of each configuration item in the plurality of configuration items, one or more associated functions of each configuration item in the listing of configuration items, and one or more actions to take upon the determination of the incident for the at least one configuration item within the information technology environment,
and wherein the master event table is stored to a master server in the information technology environment.

* * * * *